June 23, 1931.  J. B. BERRIGAN  1,811,533
FILTER BAG CONNECTER
Filed Feb. 17, 1930

Witness:
W. A. Snow

Inventor:
John B. Berrigan
By Rummler, Rummler
+ Woodworth  Atty

Patented June 23, 1931

1,811,533

UNITED STATES PATENT OFFICE

JOHN B. BERRIGAN, OF CHICAGO, ILLINOIS, ASSIGNOR TO THE PRESS & DRIER CO.

FILTER BAG CONNECTER

Application filed February 17, 1930. Serial No. 429,147.

This invention relates to means for connecting together at their sides a plurality of filter bags to afford communication between the bags, so that the pressure remains constant throughout a series of bags while the same are subjected to hydraulic pressure presses. For example, such filter presses are used in the treatment of activated sludge, and the purpose of this invention is to provide a filter bag connecter primarily useful with that class of machinery.

Among the objects of the invention is to provide an improved filter bag connecter which, in the assembling operation may be applied to the bags from the exterior thereof, and without passing through the fabric forming the bags, and to provide a filter bag connecter which may be easily and rapidly removed and replaced when it is necessary to remove one or more of the bags for repair or replacement.

The objects of the invention are accomplished by the arrangement shown in the accompanying drawings, in which.

Figure 1:
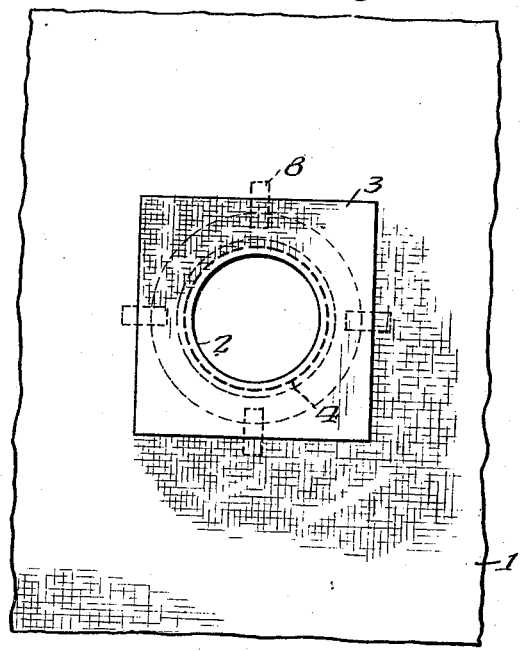
Figure 1 is a fragmentary face view of a filter bag provided with improved connecter.
Figure 2:
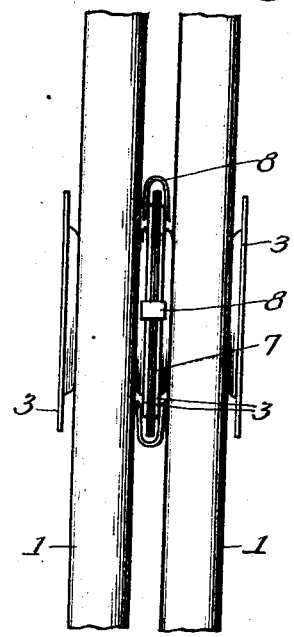
Fig. 2 shows a fragmentary end view of a pair of connected filter bags.
Figure 3:
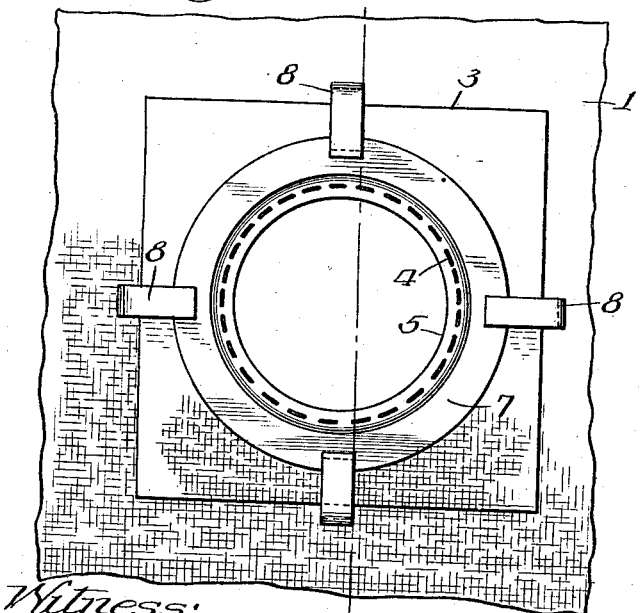
Fig. 3 is an enlarged face view of the connecter.

In the particular type of filter press for which the connecter shown in the drawings is designed, it has been customary to provide for the connection between adjacent bags by cutting circular openings in the sides of the bags and drawing the fabric walls of adjacent bags together at these openings by means of rings placed in position from the interior of the bags before the open ends thereof are closed. These rings are drawn together by screws passing from one ring through the filter material and through the opposite ring. Such an arrangement resulted in many inconveniences and loss of time when the filter is assembled or replacements of filter bags are made.

A common arrangement of the filter bags in the press is to hang the bags side by side from upper supports between a series of movable lattices, which protect the bags against bursting during compression. The bags are sealed at their upper and lower ends before the filling operation. The old form of connecters were inserted through the bottom ends of the bags before these ends were sealed. The connecter to which this application for patent relates, is applied from the outside irrespective of the seals at the lower ends of the bags.

As indicated in the drawings, the adjacent side walls 1 of the filter bags are provided with circular openings 2. The material of the filter bags is generally a coarse burlap. A piece of similar burlap, such as the square one shown at 3, is stitched to the filter bag as indicated at 4, and is provided with a circular opening 5 registering with the opening 2. The stitching is near the opening, and thus a space 6 is provided between the body of the filter bag and the piece of burlap 3 stitched thereto.

Figure 4:
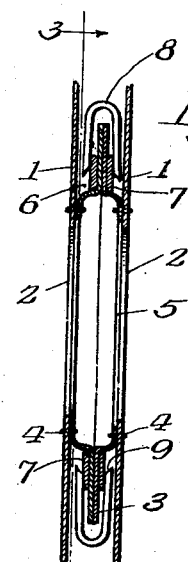
Fig. 4 is a sectional detail taken on the line 4—4 of Fig. 3.

A heavy steel ring 7 is placed in the space 6. Adjacent rings are then drawn together by the application of the U-shaped clips 8, as shown in Figure 4. These clips are preferably beveled at their open ends 9 for ease of application, and are made of spring material so as to press inwardly against the rings when applied thereto. When the clips are applied to the connecter the seal between adjacent bags is assured throughout the peripheral edges of the communicating openings of the bags.

Although but one specific embodiment of this invention has been herein shown and described, it will be understood that details of the construction may be altered without departing from the invention.

I claim:

1. The combination of a plurality of filter bags arranged side by side in parallel relation, registering apertures in the fabric walls of adjacent bags, a piece of flexible material having a similar opening therein, secured to the exterior side of each filter bag at the openings therein, a ring between said piece of flexible material and the side wall of a bag, and U-shaped clips applied over the outer edges of said rings to connect adjacent bags together, said U-shaped clips being resilient and having the inner edges of their ends beveled.

2. The combination of a plurality of filter bags arranged side by side in parallel relation, registering apertures in the fabric walls of adjacent bags, a piece of material having a similar opening therein, secured to the exterior side of each filter bag at the openings therein, a ring between said piece of material and the side wall of a bag, and means for clamping adjacent rings and the pieces of material therebetween together.

3. The combination of a plurality of filter bags arranged side by side in parallel relation, registering apertures in the fabric walls of adjacent bags, a piece of material having a similar opening therein, secured to the exterior side of each filter bag at the openings therein, a ring between said piece of material and the side wall of a bag, and U-shaped clips applied over the outer edges of said rings to connect adjacent bags together.

Signed at Chicago this 13th day of Febr'y 1930.

JOHN B. BERRIGAN.